US012799345B2

(12) United States Patent
Valla et al.

(10) Patent No.: US 12,799,345 B2
(45) Date of Patent: Nov. 17, 2026

(54) INKJET PRINTABLE INKS FOR FABRICATING ENAMEL COATINGS

(71) Applicant: FENZI AGT NETHERLANDS B.V., Maastricht (NL)

(72) Inventors: Maxence Valla, Maastricht (NL); Jean Luc Loontjens, Maastricht (NL)

(73) Assignee: FENZI AGT NETHERLANDS B.V. (NL)

( * ) Notice: Subject to any disclaimer, the term of this patent is extended or adjusted under 35 U.S.C. 154(b) by 154 days.

(21) Appl. No.: 18/730,732

(22) PCT Filed: Jan. 17, 2023

(86) PCT No.: PCT/NL2023/050016

§ 371 (c)(1),
(2) Date: Jul. 19, 2024

(87) PCT Pub. No.: WO2023/146392

PCT Pub. Date: Aug. 3, 2023

(65) Prior Publication Data

US 2025/0101245 A1 Mar. 27, 2025

(30) Foreign Application Priority Data

Jan. 28, 2022 (GB) ....................................... 2201111

(51) Int. Cl.

| | |
|---|---|
| ***C09D 11/38*** | (2014.01) |
| ***B41J 2/01*** | (2006.01) |
| ***B41J 2/21*** | (2006.01) |
| ***C03C 3/066*** | (2006.01) |
| ***C03C 3/14*** | (2006.01) |
| ***C03C 8/04*** | (2006.01) |
| ***C03C 8/06*** | (2006.01) |
| ***C03C 8/14*** | (2006.01) |
| ***C03C 8/16*** | (2006.01) |
| ***C03C 8/22*** | (2006.01) |
| ***C09D 11/322*** | (2014.01) |
| ***C09D 11/36*** | (2014.01) |

(52) U.S. Cl.

CPC ................. *C09D 11/38* (2013.01); *B41J 2/01* (2013.01); *B41J 2/2107* (2013.01); *C03C 3/066* (2013.01); *C03C 3/14* (2013.01); *C03C 8/04* (2013.01); *C03C 8/06* (2013.01); *C03C 8/14* (2013.01); *C03C 8/16* (2013.01); *C03C 8/22* (2013.01); *C09D 11/322* (2013.01); *C09D 11/36* (2013.01)

(58) Field of Classification Search

CPC ....... C09D 11/38; C09D 11/322; C09D 11/36; C09D 11/101; C09D 11/40; C09D 11/30; C09D 11/32; C09D 11/324; C09D 11/328; C09D 11/102; C09D 11/005; C09D 11/54; C09D 11/52; C09D 11/106; C09D 11/326; C09D 11/107; C09D 11/03; C09D 11/037; C09D 11/033; C09D 11/108; C03C 3/066; C03C 3/14; C03C 8/04; C03C 8/06; C03C 8/14; C03C 8/16; C03C 8/22; B41J 2/01; B41J 2/2107; B41J 2/2114; B41J 11/0015; B41J 11/002; B41J 2/211; B41J 2/1433; B41J 2/17; B41J 2/17593; B41J 2/1755; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; C09C 1/00; C09C 3/10; B41M 5/00; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS 4,892,847 A * 1/1990 Reinherz ................. C03C 3/064 501/14
5,093,285 A * 3/1992 Murkens ................. C03C 17/02 502/79
5,200,369 A * 4/1993 Clifford .................... C03C 8/02 501/59
5,714,420 A * 2/1998 Sakoske .................. C03C 17/04 427/508
5,968,659 A * 10/1999 Sakoske .................... C03C 8/14 428/428

(Continued)

FOREIGN PATENT DOCUMENTS

EP 0370683 A1 5/1990
EP 1658342 B1 5/2010
WO 2020021235 A1 1/2020

OTHER PUBLICATIONS

International Search Report and Written Opinion issued in PCT/NL2023/050016, dated Apr. 14, 2023, 8 pages.

(Continued)

*Primary Examiner* — Manish S Shah
(74) *Attorney, Agent, or Firm* — HAYES SOLOWAY P.C.

(57) ABSTRACT

An inkjet printable enamel ink including: at least one glass frit; at least one pigment; a crystalline bismuth silicate powder; and an organic carrier, wherein the glass frit, pigment, and crystalline bismuth silicate powder have a d99 particle size distribution of less than 4 micrometers in the organic carrier, wherein the ink has a viscosity less than 30 $mPa \cdot S^{-1}$ at 100 $s^{-1}$ shear rate and a temperature of 35° C., and wherein the ink has a total solid content, including the glass frit, pigment, and crystalline bismuth silicate powder, of no more than 60 wt %.

18 Claims, No Drawings

(56) References Cited

U.S. PATENT DOCUMENTS

| | | | | |
|---|---|---|---|---|
| 6,207,285 | B1 * | 3/2001 | Sakoske | C03C 8/14 427/508 |
| 6,357,868 | B1 * | 3/2002 | Pfaff | B41M 5/0256 347/100 |
| 2004/0029703 | A1 * | 2/2004 | Sridharan | C03C 17/04 501/72 |
| 2008/0261795 | A1 * | 10/2008 | Prunchak | C03C 1/00 501/17 |
| 2010/0009837 | A1 | 1/2010 | Sakoske | |
| 2016/0185657 | A1 * | 6/2016 | Sakoske | C03C 8/20 428/428 |
| 2021/0115281 | A1 * | 4/2021 | Guedon | B41M 5/007 |

OTHER PUBLICATIONS

International Preliminary Report on Patentability issued in PCT/NL2023/050016, dated Jul. 30, 2024, 5 pages.

* cited by examiner

INKJET PRINTABLE INKS FOR FABRICATING ENAMEL COATINGS

CROSS REFERENCE TO RELATED APPLICATIONS

This application is a US National Phase of PCT International Patent Application Serial No. PCT/NL2023/050016, filed Jan. 17, 2023, which claims priority to Great Britain Patent Application Serial No. 2201111.8, filed Jan. 28, 2022, the contents of which are incorporated herein by reference.

FIELD OF THE INVENTION

The present invention relates to inkjet printable inks for fabricating enamel coatings.

BACKGROUND OF THE INVENTION

Enamels are widely used to decorate or produce coatings on glass and ceramic substrates, such as tableware, signage, tiles, architectural glass etc. Enamels are especially useful in forming coloured borders around glass sheets used for automotive windshields, side windows, and rear windows. The coloured borders enhance appearance as well as prevent degradation of underlying adhesives by UV radiation. Moreover, the coloured borders may conceal buss bars and wiring connections of glass defrosting systems.

Enamels typically comprise pigment and glass frit. In general, they are applied to a substrate (e.g., a windshield surface) as a paste or ink, e.g., by printing. The paste or ink may comprise particles of pigment and glass frit dispersed in a liquid dispersion medium. Such pastes or inks may be referred to as “inorganic ceramic pastes” or “inorganic ceramic inks”. After application of a coating of paste/ink to the substrate, the paste/ink is typically dried and the applied coating undergoes firing, i.e., is subjected to heat treatment to cause the frit to soften and fuse to the substrate, thereby adhering an enamel to the substrate. During firing, the pigment itself typically does not melt, but is affixed to the substrate by or with the frit.

Various printing techniques may be employed for the application of inorganic ceramic pastes/inks to a substrate. Screen printing and pad printing are commonly employed. Typically, high solid content and high viscosity enamel pastes are used for such printing techniques. Digital inkjet printing has also been suggested as an alternative approach. Using this approach, lower solid content and/or lower viscosity enamel inks having a smaller particle size have been found to be advantageous for the application of such inks to a substrate via inject printing.

Digital inkjet printing can provide various advantages over screen printing. For example: reduction of costs involved in storage of screens or transfer devices (due to digital storing of the desired patterns); reduction of costs for low value printing, which may be prohibitive in screen-printing; increased ease and versatility of switching from one design to another; and capacity for edge-to-edge printing. However, pastes suitable for screen or pad printing are typically unsuitable for application via inkjet printing, as they tend to have a viscosity which is too high, and the particle size of the glass frit and pigment particles may be such that the particles could clog the nozzles of an inkjet printer. Typically, an inorganic ceramic ink suitable for inkjet printing (i.e., inkjettable) will have a viscosity of less than 25 cps (at printing temperature) and the particles dispersed therein will have a particle size of less than 2 microns, preferably less than 1 micron.

Proper frit selection is crucial in the preparation of inorganic ceramic inks since the frit properties influence both the firing behavior and the properties of the final, fired enamel. In general, inorganic ceramic inks comprise particles of glass frit having a single glass composition. Typically, the composition of the glass frit comprises silica, bismuth oxide and boron oxide. EP 1658342, for example, describes an ink-jet ink composition for printing on a ceramic substrate, which ink composition comprises an organic solvent and sub-micron particles of a glass frit composed of $SiO_2$, $Bi_2O_3$ and $B_2O_3$.

As an alternative, WO 2020/021235 teaches that it is advantageous to provide an ink-jet ink composition comprising particles of a first glass frit which comprises silica but little or no boron oxide and particles of a second glass frit which comprises boron but little or no silica. It is taught that the temperature range at which the enamel fuses to the substrate during firing can be better controlled using the two-frit composition. Furthermore, functional properties of the final enamel such as depth of color and bending strength can be improved. WO 2020/021235 thus proposes an ink for forming an enamel comprising: particles of a first glass frit; particles of a second glass frit; and a liquid dispersion medium, wherein the first glass frit comprises greater than 5 wt % silicon oxide ($SiO_2$) and less than 5 wt % boron oxide ($B_2O_3$), wherein the second glass frit comprises boron oxide ($B_2O_3$) and less than 5 wt % of silicon oxide ($SiO_2$), and wherein both the particles of the first glass frit and the particles of the second glass frit have a D90 particle size of less than 5 microns.

The present specification is aimed at providing improved inkjet printable inks for fabricating enamel coatings.

SUMMARY OF THE INVENTION

The present inventors have found that while enamel forming inks have previously been formulated with the correct physical properties (e.g., low viscosity, low solid content, low particle size) to enable good inkjet printability for the inks, the properties of the resultant enamel coatings after firing tend to have different, generally worse, functional properties than optimized state-of-the-art commercial enamel pastes printed via screen printing methods. Desired functional properties of the enamel coatings for end applications, such as automotive glass applications, include: good colour; good silver hiding properties; good anti-stick properties; good acid resistance properties; low firing temperature; good bending strength properties; and low surface roughness.

The present inventors have found that the functional properties of enamel coatings formed from inkjet inks (low solid content, low viscosity, low particle size) can be significantly improved by including a crystalline bismuth silicate powder (e.g., Eulytite) in such inks. Such crystalline bismuth silicate powder has previously been utilized in certain screen-printed enamel pastes (which typically have a much higher solid content, viscosity and particle size) to improve the anti-stick properties of such pastes. Surprisingly, the present inventors have found that such crystalline bismuth silicate powder, when included in inkjet ink formulations, significantly improves the enamel coatings formed from such inkjet ink formulations. It has been found that the crystalline bismuth silicate powder enables inkjet ink formulations to achieve enamel coatings with similar or better functional performance characteristics when compared with enamel coatings formed from state-of-the-art commercial enamel pastes printed via screen printing methods.

In light of the above, the present specification provides an inkjet printable enamel ink comprising: at least one glass frit; at least one pigment; a crystalline bismuth silicate powder; and an organic carrier, wherein the glass frit, pigment, and crystalline bismuth silicate powder have a d99 particle size distribution of less than 4 micrometers in the organic carrier (preferably less than 2 micrometers), wherein the ink has a viscosity less than 30 $mPa\cdot S^{-1}$ at 100 $s^{-1}$ shear rate and a temperature of 35° C., and wherein the ink has a total solid content of no more than 60 wt % of the ink.

The quantity of the crystalline bismuth silicate powder in the ink may be: at least 0.05 wt %, 0.08 wt %, or 0.1 wt %; no more than 5 wt %, 2 wt %, 1 wt %, 0.5 wt %, or 0.2 wt %; or within a range defined by any combination of the aforementioned lower and upper limits. Advantageously, the crystalline bismuth silicate powder is Eulytite which is a mineral with a chemical formula $Bi_4(SiO_4)_3$. It is notable that in the inkjet ink formulations of the present specification, a small quantity (e.g., 0.1 to 0.2 wt %) of the crystalline bismuth silicate powder can make a big difference in the performance characteristics of the enamel coating formed after inkjet printing and firing the ink. Furthermore, it is preferred to only include a small quantity of the crystalline bismuth silicate powder in order to achieve improved enamel performance characteristics as too much crystalline bismuth silicate powder can lead to detrimental enamel characteristics. As such, there is an optimal window for the amount of crystalline bismuth silicate powder included in inkjet ink formulations to achieve desired enamel characteristics. The inkjet printable enamel ink can be formulated to have a viscosity: no more than 30, 28, 25, or 20 $mPa\cdot S^{-1}$ at 100 $s^{-1}$ shear rate and a temperature of 35° C.; no less than 5, 7, or 10 $mPa\cdot S^{-1}$ at 100 $s^{-1}$ shear rate and a temperature of 35° C.; or within a range defined by any combination of the aforementioned upper and lower limits. It should be noted that the viscosity is measured at 35° C. because this is the typical operating temperature for printing inkjet inks.

The inkjet printable enamel ink can be formulated to have a total solid content of: no more than 60 wt %, 58 wt %, 57 wt %, or 55 wt %; no less than 30 wt %, 35 wt %, 40 wt %, or 45 wt %; or within a range defined by any combination of the aforementioned upper and lower limits. Screen printing pastes typically have a total solid content of greater than 70 wt %. In contrast, inkjet inks typically have a lower solid content, e.g., below 55 wt %.

According to certain formulations, the ink comprises at least two different glass frits. For example, the two different glass frits may comprise particles of a first glass frit and particles of a second glass frit, wherein the first glass frit comprises greater than 5 wt % silicon oxide ($SiO_2$) and less than 5 wt % boron oxide ($B_2O_3$), and wherein the second glass frit comprises boron oxide ($B_2O_3$) and less than 5 wt % of silicon oxide ($SiO_2$). Optionally, the first glass frit includes no boron oxide and the second glass frit includes no silicon oxide.

The formulations comprising two glass frits are similar to those disclosed in WO 2020/021235. A major difference is the addition of the crystalline bismuth silicate powder which has resulted in a significant improvement in the performance characteristics of the enamel coating formed after inkjet printing of the ink and firing. In addition to the crystalline bismuth silicate powder, according to certain formulations the composition of the first frit has been modified compared to that disclosed in WO 2020/021235. In WO 2020/021235, the ink is disclosed as comprising a mixture of: a first frit (Johnson Matthey product number 5466); and a second frit (Johnson Matthey product number 5317). The first frit (Johnson Matthey product number 5466) of WO 2020/021235 has the following composition:

| Component | Mol % | Mass % |
|---|---|---|
| ZnO | 40-50 | 20-30 |
| $SiO_2$ | 30-40 | 10-20 |
| $Bi_2O_3$ | 10-20 | 50-60 |

In contrast, certain ink formulations of the present specification have a new first frit composition which comprises or consists of:

- >15 to ≤50 wt % $SiO_2$;
- ≥40 to ≤80 wt % $Bi_2O_3$;
- ≥0 to ≤5 wt % ZnO (optionally >0);
- ≥0 to ≤5 wt % $Li_2O$ (optionally >0);
- ≥0 to ≤5 wt % F (optionally >0);
- ≥0 to ≤5 wt % $Na_2O$ (optionally >0);
- ≥0 to ≤5 wt % CuO (optionally >0);
- ≥0 to ≤5 wt % $Al_2O_3$ (optionally >0);
- ≥0 to ≤5 wt % MnO (optionally >0); and
- ≥0 to ≤5 wt % $Fe_2O_3$ (optionally >0).

It will be noted that key differences between the first frit of the present specification and the first frit as disclosed in WO 2020/021235 include a significantly lower ZnO content and also the additional of other components in the frit selected from one or more of $Li_2O$, F, $Na_2O$, CuO, $Al_2O_3$, MnO and $Fe_2O_3$. This new frit has been found to be advantageous for use in the inkjet printable ink formulations as described herein. However, it is also envisaged that the new frit may have other applications, particular in other enamel coating applications. Accordingly, another aspect of the present specification is a glass frit composition as described above.

The second glass frit may be the same as that disclosed in WO 2020/021235. For example, the second glass frit may comprise or consist of:

- ≥40 to ≤70 wt % $Bi_2O_3$;
- >5 to ≤25 wt % $B_2O_3$;
- ≥5 to ≤25 wt % ZnO;
- ≥0 to ≤25 wt % $SnO_2$ (optionally >0).

Another difference between certain ink formulations of the present specification and those of WO 2020/021235 is the relative amount of the first and second glass frits. It has been found that the relative amounts of the first and second glass frits can be tuned to achieve a suitable firing window for fabricating an enamel coating. For example, the ink may comprise or consistent of:

- 10 to 30 wt % of the first glass frit (optionally 12 to 20 wt %);
- 10 to 30 wt % of the second glass frit (optionally 15 to 25 wt %);
- 0.05 to 5 wt % of the crystalline bismuth silicate powder (optionally 0.1 to 0.5 wt %);
- 10 to 20 wt % of the pigment (optionally 12 to 18 wt %); and
- 40 to 60 wt % of the organic carrier (optionally 45 to 60 wt %).

Advantageously, the weight ratio of the first and second frits is between 0.8:1 and 1:0.8, optionally in a range 0.9:1 to 1:0.9.

The present specification also provides a method of forming an enamel coating on a substrate, the method comprising: depositing a coating of the ink as described herein onto a substrate using a digital inkjet printer; and firing the coating to form an enamel coating. In this regard, deposition parameters of the digital inkjet printer can be selected/adjusted to provide an enamel coating with an optical density after firing of larger than 3. Furthermore, the inks of the present specification can be formulated as described herein such that they can be fired at a temperature in a range 500° C. to 730° C. for a time-period between 2 and 20 minutes to achieve an enamel coating with similar or better functional performance characteristics when compared with enamel coatings formed from state-of-the-art commercial enamel pastes printed via screen printing methods.

DETAILED DESCRIPTION

For a better understanding of the present invention and to show how the same may be carried into effect, certain embodiments of the present invention will now be described by way of example only.

As described in the summary section, the present specification provides an inkjet printable enamel ink comprising: at least one glass frit; at least one pigment; a crystalline bismuth silicate powder; and an organic carrier, wherein the glass frit, pigment, and crystalline bismuth silicate powder have a d99 particle size distribution of less than 4 micrometers in the organic carrier (preferably less than 2 micrometers), wherein the ink has a viscosity less than 30 $mPa \cdot S^{-1}$ at 100 $s^{-1}$ shear rate and a temperature of 35° C., and wherein the ink has a total solid content of no more than 60 wt % of the ink. It has been found that such inkjet printable ink compositions achieve enamel coatings with better functional performance characteristics than previous inkjet printable ink compositions and result in similar or better functional performance characteristics when compared with enamel coatings formed from state-of-the-art commercial enamel pastes printed via screen printing methods. As such, the inkjet printable ink compositions can provide a replacement for state-of-the-art commercial enamel pastes printed via screen printing methods while making use of the benefits of digital inkjet printing when compared to screen printing (e.g., flexibility to change printing patterns, no need for bespoke hardware screens for different patterns, etc.).

Compositional ranges for the glass frit components and the crystalline bismuth silicate powder have been provided in the summary of invention section. Having regard to the glass frit compositions, as will be understood by the skilled person, a glass material, such as a glass frit, is typically an amorphous material which exhibits a glass transition. In the glass frit compositions described herein, amounts of components are given as weight percentages. These weight percentages are with respect to the total weight of the glass frit composition. The weight percentages are the percentages of the components used as starting materials in preparation of the glass frit compositions, on an oxide basis. As the skilled person will understand, starting materials other than oxides of a specific element may be used in preparing the glass frits of the present specification. Where a non-oxide starting material is used to supply an oxide of a particular element to the glass frit composition, an appropriate amount of starting material is used to supply an equivalent molar quantity of the element had the oxide of that element been supplied at the recited wt %. This approach to defining glass frit compositions is typical in the art. As the skilled person will readily understand, volatile species (such as oxygen) may be lost during the manufacturing process of the glass frit, and so the composition of the resulting glass frit may not correspond exactly to the weight percentages of starting materials, which are given herein on an oxide basis. Analysis of a fired glass frit by a process known to those skilled in the art, such as Inductively Coupled Plasma Emission Spectroscopy (ICP-ES), can be used to calculate the starting components of the glass frit composition in question.

As will also be readily understood by the skilled person, during manufacture of glass frit, the glass composition may be contaminated with low levels of impurities. For example, in a melt/quench glass forming process, such impurities may derive from refractory linings of vessels employed in the melting step. Thus, whilst a total absence of a particular component in a glass composition may be desirable, in practice this may be difficult to achieve. As such, the compositional information should be interpreted with this is mind. Where a zero value is stated for a particular component, this means that there is no intentionally added component and no raw material was employed in the manufacture of the glass frit which was intended to deliver the component into the final glass composition. The presence of any low levels of such a component in the glass frit composition is due to contamination during manufacture.

Particles of glass frit may be prepared by mixing together the required raw materials and melting them to form a molten glass mixture, then quenching to form a glass (melt/quench glass forming). The skilled person is aware of alternative suitable methods for preparing glass frit. Suitable alternative methods include water quenching, sol-gel processes and spray pyrolysis. The process may further comprise milling the resulting glass frit to provide glass frit particles of the desired particle size. For example, the glass frit may be milled using a bead-milling process, such as wet bead-milling in an alcohol-based or a water-based solvent. In accordance with the present specification, the glass frits, along with the other solid components of the ink, are milled to a small particle size suitable for inkjet printing. In this regard, the glass frit, pigment, and crystalline bismuth silicate powder are milled to have a d99 particle size distribution of less than 4 micrometers in the organic carrier (preferably less than 2 micrometers). The term "D99 particle size" herein refers to particle size distribution, and a value for D99 particle size corresponds to the particle size value below which 99%, by volume, of the total particles in a particular sample lie. The D99 particle size may be determined using a laser diffraction method (e.g., using a Malvern Mastersizer™ 2000).

In some embodiments of the present specification, the glass frits may include a crystalline portion in addition to an amorphous glass phase. The use of such glass frits may promote or induce crystallization of the frits during firing, which may be advantageous in certain applications.

In addition to the glass frit and crystalline bismuth silicate powder components, the inks of the present specification also include pigment. Pigments may include mixed metal oxide pigment or carbon black pigment. The type and amount of pigment will depend upon the range of colour, gloss, and opacity desired in the final enamel. Suitable pigments may comprise complex metal oxide pigments, such as corundum-hematite, olivine, priderite, pyrochlore, rutile, and spinel. Other categories such as baddeleyite, borate, garnet, periclase, phenacite, phosphate, sphene and zircon may be suitable in certain applications. Typical complex metal oxide pigments which may be used to produce black colours in the automotive industry include transition metal oxides having spinel-structure, such as spinel-structure oxides of copper, chromium, iron, cobalt, nickel, manganese, and the like. Although these black spinel pigments are preferred for use in the automotive industry, other metal oxide pigments to produce other various colours can be employed. Examples of other end uses include architectural, appliance, and beverage industries. Examples of commercially available pigments include $CuCr_2O_4$, (Co, Fe) $(Fe,Cr)_2O_4$, (NiMnCrFe), and the like. Mixtures of two or more pigments may also be employed.

The glass frit, crystalline bismuth silicate powder, and pigment components are disposed in a fluid organic carrier medium. The organic carrier medium suspends the particle mixture at application conditions and is removed during drying and/or firing (or pre-firing) of the applied coating of ink. Factors influencing the choice of medium include solvent viscosity, evaporation rate, surface tension, odour and toxicity. Where the ink is to be applied to a substrate via inkjet printing, preferred mediums include, but are not limited to, diethylene glycol monobutyl ether, dipropylene glycol monomethyl ether, tripropylene glycol monomethyl ether, dibasic esters, and 1-methoxy 2-propanol. A particularly preferred medium comprises dipropylene glycol monomethyl ether. The ink may also further comprise one or more additives. These may include dispersing agents, such as, but not limited to those from the BYKJET, disperBYK, Solsperse or Dispex ranges, in particular BYKJET 9151, resins and/or rheology modifiers.

EXAMPLES

Examples of the present specification provide laminating inkjet inks with boron free bismuth silicate frit and silicon free bismuth boron frit. The inks were made with a newly developed boron free bismuth silicate frit and combined with an existing silicon free bismuth boron frit. A black pigment was added for colour. The addition of a crystalline bismuth silicate powder (e.g., Eulytite) significantly improves performance characteristics of the resultant enamel coating after inkjet printing and firing. It should be noted that while in certain preferred examples described here the crystalline bismuth silicate powder is applied to inkjet ink formulations comprising two different glass frits, the crystalline bismuth silicate powder can also be included in inkjet ink formulations which only include a single type of glass frit.

The aforementioned components were bead milled separately in an organic medium and then mixed together in a bead mill. After sieving and viscosity adjustment, the inks were ready to use. The performance of the inks after inkjet printing and firing was found to be very similar to an existing glass enamel paste applied by screen printing for automotive glass applications. Furthermore, the glass inks make it possible to quickly switch to different designs without addition costs. Further still, the glass inks give 30 to 50% higher bending strength to decorated substrates compared to the existing glass enamel paste applied by screen printing.

Black enamel inkjet printable inks were thus formulated comprising: (1) a BiSi glass frit; (2) a BiB glass frit; (3) a black pigment; (4) a crystalline bismuth silicate powder; and (5) an organic carrier. An example of the BiSi glass frit (Frit 1 of the present specification) is provided below alongside an existing commercial BiSi frit for comparison:

| Frit 1 (BiSi) | | | JM Product No. 5466 | | |
|---|---|---|---|---|---|
| Component | Mol % | Mass % | Component | Mol % | Mass % |
| $SiO_2$ | 63.40 | 30.35 | $SiO_2$ | 30-40 | 10-20 |
| $Bi_2O_3$ | 16.77 | 62.23 | $Bi_2O_3$ | 10-20 | 50-60 |
| ZnO | 2.09 | 1.35 | ZnO | 40-50 | 20-30 |
| $Li_2O$ | 9.34 | 2.22 | | | |
| F | 2.99 | 0.45 | | | |
| $Na_2O$ | 2.49 | 1.23 | | | |
| CuO | 1.45 | 0.92 | | | |
| $Al_2O_3$ | 0.83 | 0.68 | | | |
| MnO | 0.34 | 0.19 | | | |
| $Fe_2O_3$ | 0.30 | 0.38 | | | |

An example of a BiB frit (Frit 2 of the present specification) is provided below:

| Frit 2 (BiB Frit) | | |
|---|---|---|
| Component | Mol % | Mass % |
| $Bi_2O_3$ | 22.21 | 59.98 |
| $B_2O_3$ | 32.26 | 13.02 |
| ZnO | 31.76 | 14.98 |

The frits, pigment and crystalline bismuth silicate powder were bead milled individually to a desired particle size distribution (d99<2 μm) in organic media and then mixed together to create an ink with a viscosity between 15 and 20 $mPa \cdot S^{-1}$ at 35° C., 100 s-1 shear rate with a 5 cm spindel with 1° angle. Two examples of ink formulations, along with associated ranges for component amounts, are provided in the table below:

| | Example 1 | Range Example 1 | Example 2 | Range Example 2 |
|---|---|---|---|---|
| Frit 1 (BiSi) | 15.7083 | 12-17 | 18.7223 | 15-20 |
| Frit 2 (BiB) | 21.7459 | 20-25 | 18.7223 | 15-20 |
| Crystalline bismuth silicate | 0.1832 | 0.1-0.2 | 0.1988 | 0.1-0.2 |
| Pigment | 14.6315 | 10-18 | 14.6315 | 10-20 |
| Organic Carrier | 47.7312 | 45-60 | 47.7252 | 45-60 |

The inks were used to build laminated motor vehicle glass panels. In this regard, the inks were deposited on a glass substrate (typically a soda-lime glass) via digital inkjet printing, dried, and fired. The process step are as follows:

(1) Deposit the ink on a glass substrate with a digital printer. The deposition parameters are adjusted to reach an optical density after firing of larger than 3. In these examples, 835 DPI (dots per inch) was used.

(2) Fire in a gradient kiln at 540/615/705° C. for 600 seconds.

The Example 1 ink had a higher firing temperature than the Example 2 ink. As such, the Example 2 ink is preferred for low firing temperature applications. The lowering of the firing temperature was achieved by tuning the relative amounts of the first and second glass frits. It was found that a roughly 1:1 wt % ratio for the two glass frits provided a good firing window.

The enamel coating fabricated using the Example 2 ink was tested and compared with an enamel coating fabricated using a state-of-the-art enamel paste deposited via screen printing. Enamel coating test results are provided in the table below.

| Type | Screen printed paste | Inkjet printed ink |
|---|---|---|
| Applied wet layer thickness | 22.5 μm | — |
| Applied dots per inch | — | 835 |
| No porosity above temperature | 553° C. | 556° C. |
| Minimum L*-value (Cielab color space) | 4.66 | 4.68 |
| Minimum a*-value (Cielab color space) | −0.21 | −0.24 |
| Minimum b*-value (Cielab color space) | −0.54 | −0.91 |
| Temperature at minimum L*-value (Cielab color space) | 584° C. | 583° C. |
| Lower temperature of firing window | 560° C. | 569° C. |
| Upper temperature of firing window | 639° C. | 643° C. |
| Average optical density | 3.04 | 3.26 |
| Average surface roughness Ra | 0.692 μm | 0.288 μm |
| Average surface roughness Rz | 4.96 μm | 2.38 μm |
| Acid resistance (3, 7% HCL, 15 minutes, ASTM evaluation) | 5 | 5-6 |
| Scratch test (with Sclerometer at 16N, visual check) | nok | ok |
| Anti-stick value (N) at 620° C./600 sec (specification value <5N) | 1.3 | 2.9 |
| Anti-stick value (N) at 640° C./600 sec (specification value <5N) | 1.3 | 1.7 |
| Anti-stick value (N) at 660° C./600 sec (specification value <5N) | 1.4 | 1.4 |
| Average Static bending strength (Coaxial double ring test EN 1288-5) | 87.4 Mpa | 144.5 Mpa |

As can be seen from the values in the table, most of the performance parameters are similar for both enamel samples. However, bending strength is much higher for the enamel formed by the inkjet ink and surface roughness is lower. As such, the enamel formed by the inkjet ink is advantageous over the enamel formed by the screen-printed paste.

While this invention has been particularly shown and described with reference to certain examples, it will be understood to those skilled in the art that various changes in form and detail may be made without departing from the scope of the invention as defined by the appended claims.

The invention claimed is:

1. An inkjet printable enamel ink comprising:

at least one glass frit;

at least one pigment;

a crystalline bismuth silicate powder; and an organic carrier, wherein the glass frit, pigment, and crystalline bismuth silicate powder have a d99 particle size distribution of less than 4 micrometers in the organic carrier, wherein the ink has a viscosity less than 30 mPa·$S^{-1}$ at 100 $s^{-1}$ shear rate and a temperature of 35° C., wherein the ink has a total solid content, including the glass frit, pigment, and crystalline bismuth silicate powder, of no more than 60 wt %, wherein the ink comprises at least two different glass frits, wherein the first glass frit comprises greater than 5 wt % silicon oxide ($SiO_2$) and less than 5 wt % boron oxide ($B_2O_3$), and wherein the second glass frit comprises boron oxide ($B_2O_3$) and less than 5 wt % of silicon oxide ($SiO_2$).

2. An inkjet printable enamel ink according to claim 1, wherein the crystalline bismuth silicate powder is Eulytite.

3. The inkjet printable enamel ink according to claim 1, wherein the quantity of the crystalline bismuth silicate powder in the ink is: at least 0.05 wt %, 0.08 wt %, or 0.1 wt %; no more than 5 wt %, 2 wt %, 1 wt %, 0.5 wt %, or 0.2 wt %; or within a range defined by any combination of the aforementioned lower and upper limits.

4. The inkjet printable enamel ink according to claim 1, wherein the viscosity of the ink is: no more than 28, 25, or 20 mPa·$S^{-1}$ at 100 $s^{-1}$ shear rate and a temperature of 35° C.; no less than 5, 7, or 10 mPa·$S^{-1}$ at 100 $s^{-1}$ shear rate and a temperature of 35° C.; or within a range defined by any combination of the aforementioned upper and lower limits.

5. The inkjet printable enamel ink according to claim 1, wherein the total solid content of the ink is: no more than 58 wt %, 57 wt %, or 55 wt %; no less than 30 wt %, 35 wt %, 40 wt %, or 45 wt %; or within a range defined by any combination of the aforementioned upper and lower limits.

6. The inkjet printable enamel ink according to claim 1, wherein d99 particle size distribution of the glass frit, pigment, and crystalline bismuth silicate powder in the organic carrier is less than 2 micrometers.

7. The inkjet printable enamel ink according to claim 1, wherein the first glass frit comprises:

>15 to ≤50 wt % $SiO_2$;

≥40 to ≤80 wt % $Bi_2O_3$;

≥0 to ≤5 wt % ZnO;

>0 to ≤5 wt % $Li_2O$;

≥0 to ≤5 wt % F;

≥0 to ≤5 wt % $Na_2O$;

≥0 to ≤5 wt % CuO;

≥0 to ≤5 wt % $Al_2O_3$;

≥0 to ≤5 wt % MnO; and

≥0 to ≤5 wt % $Fe_2O_3$.

8. The inkjet printable enamel ink according to claim 1, wherein the first glass frit includes no boron oxide.

9. The inkjet printable enamel ink according to claim 1, wherein the second glass frit comprises:

≥40 to ≤70 wt % Bi2O3;

>5 to ≤25 wt % B2O3;

≥5 to ≤25 wt % ZnO;

≥0 to ≤25 wt % SnO2.

10. The inkjet printable enamel ink according to claim 1, wherein the second glass frit includes no silicon oxide.

11. The inkjet printable enamel ink according to claim 1, wherein the ink comprises:

10 to 30 wt % of the first glass frit;

10 to 30 wt % of the second glass frit;

0.05 to 5 wt % of the crystalline bismuth silicate powder;

10 to 20 wt % of the pigment; and 40 to 60 wt % of the organic carrier.

12. The inkjet printable enamel ink according to claim 1, wherein a weight ratio of the first and second glass frits is in a range 0.8:1 to 1:0.8.

13. A method of forming an enamel coating on a substrate, the method comprising:

depositing a coating of the ink as claimed in claim 1 onto a substrate using a digital inkjet printer; and firing the coating to form an enamel coating.

14. The method according to claim 13, wherein deposition parameters of the digital inkjet printer are selected to provide an enamel coating with an optical density after firing of larger than 3.

15. The method according to claim 13, wherein the firing temperature is in a range 500° C. to 730° C. for a time period between 2 and 20 minutes.

16. The inkjet printable enamel ink according to claim 2, wherein the quantity of the crystalline bismuth silicate powder in the ink is: at least 0.05 wt %, 0.08 wt %, or 0.1 wt %; no more than 5 wt %, 2 wt %, 1 wt %, 0.5 wt %, or 0.2 wt %; or within a range defined by any combination of the aforementioned lower and upper limits.

17. The inkjet printable enamel ink according to claim 7, wherein the first glass frit includes no boron oxide.

18. The method according to claim 14, wherein the firing temperature is in a range 500° C. to 730° C. for a time period between 2 and 20 minutes.

* * * * *